Jan. 8, 1935. F. X. LAUTERBUR ET AL 1,987,237
DOUGH MOLDING MACHINERY
Filed Feb. 25, 1932 4 Sheets-Sheet 2

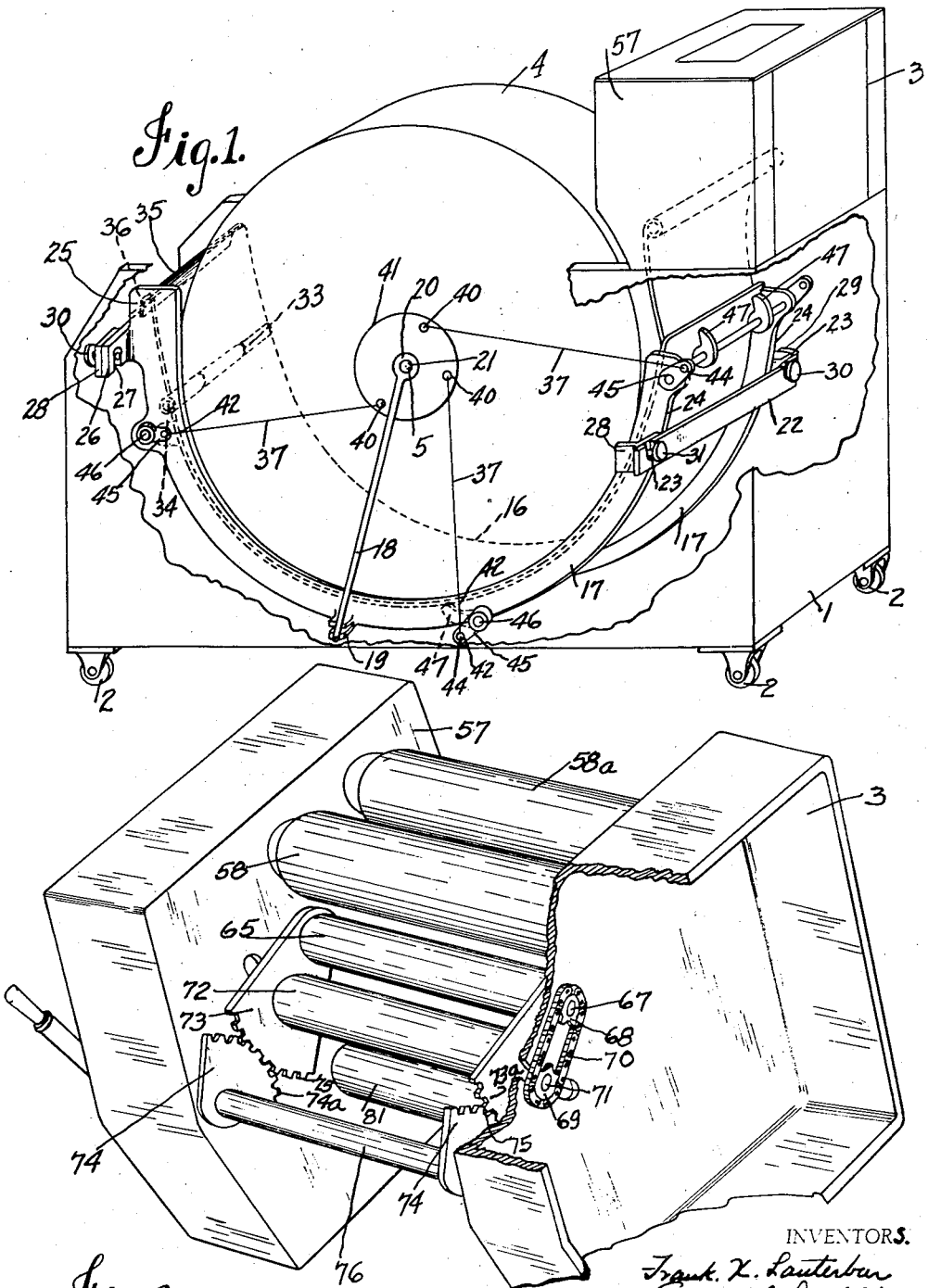

INVENTORS.
Frank X Lauterbur
Edward J Lauterbur
Allen Allen
ATTORNEYS

Jan. 8, 1935.  F. X. LAUTERBUR ET AL  1,987,237
DOUGH MOLDING MACHINERY
Filed Feb. 25, 1932  4 Sheets-Sheet 4

INVENTORS.
Frank X Lauterbur
Edward J Lauterbur
BY
ATTORNEYS

Patented Jan. 8, 1935

1,987,237

UNITED STATES PATENT OFFICE 1,987,237

DOUGH MOLDING MACHINERY

Frank X. Lauterbur and Edward J. Lauterbur, Sidney, Ohio; Wilhelmina S. Lauterbur and Leo V. Lauterbur executors of said Frank X. Lauterbur, deceased Application February 25, 1932, Serial No. 595,018

6 Claims. (Cl. 107—9)

Our invention relates to dough molding machinery adapted for molding different lengths of loaves.

It is the object of our invention to provide a dough molding machine in which the batch of dough which is to be molded is first coiled in a forming pocket and is then positively discharged from coiling position after the completion of the coil, and in which the guiding is such as to insure the coiled loaf remaining straight on the discharge apron.

It is a further object of our invention to provide a drum type molder in which the pressure plate and side guide members are formed into one unit, which unit may be readily substituted when it is desired to form a different length of loaf by placing in the molder a combined pressure plate and side guide members, with the side guide members arranged a different distance apart.

It is a further object of our invention to provide a combined pressure plate and side guide members which may be readily inserted in a position relative to the molding drum by first placing the unit in inverted position above the drum and then swinging it radially around with the drum to its proper position for molding underneath the drum.

A further object of our invention is to provide mechanism in combination with a molder for adjusting the pressure of the pressure plate and side guide units by a remote control located on the outside of the machine.

A further object is to provide a series of adjustable dough coiling rollers in combination with a dough molding machine in which the dough coiling rollers are adjustably mounted with relation to each other, and the mechanism operating the adjustable rollers is positioned on the outside of the machine so that the rollers can be positioned by the mechanism without access to the rollers being had.

A further object is to provide a series of pivotally mounted sections of a pressure plate on a dough molder which will automatically compensate for the change of position of the pressure plate with relation to other non-adjustable parts and thereby insure the continuity of the space between the pressure plates and the parts receiving the dough and discharging it.

A further object is to provide a self-adjusting mechanism for the chain drive of the rollers which will keep the chain in proper contact relation with the driving sprockets at all times, including the period of adjustment.

These and other objects will be more specifically pointed out in the specification and the description of the drawings showing a preferred arrangement of parts embodying our invention.

In the drawings:

Figure 1 is a perspective of the machine with the mechanism for driving the batch coiler omitted.

Figure 2 is a perspective view of the rolls and support which are used to coil batches of dough prior to the discharge into the dough molder.

Figure 3:
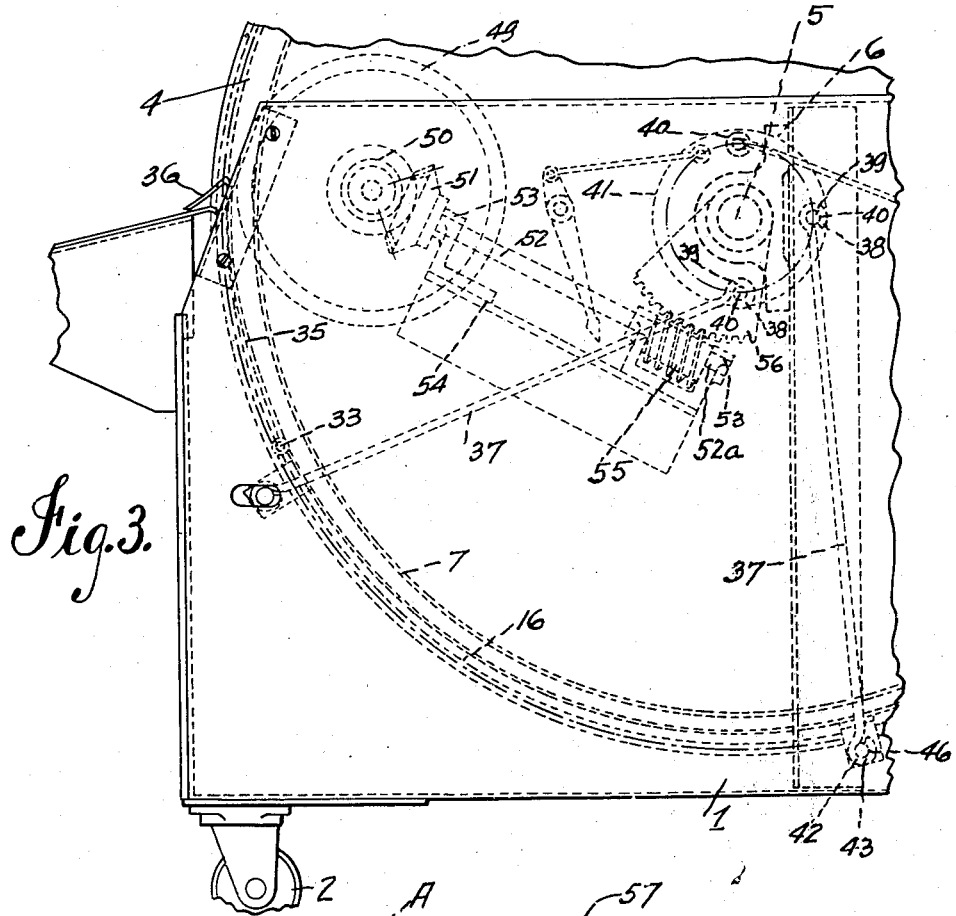
Figure 3 is a detailed elevation illustrating the mechanism for adjusting the pressure plate of the molder.
Figure 4:
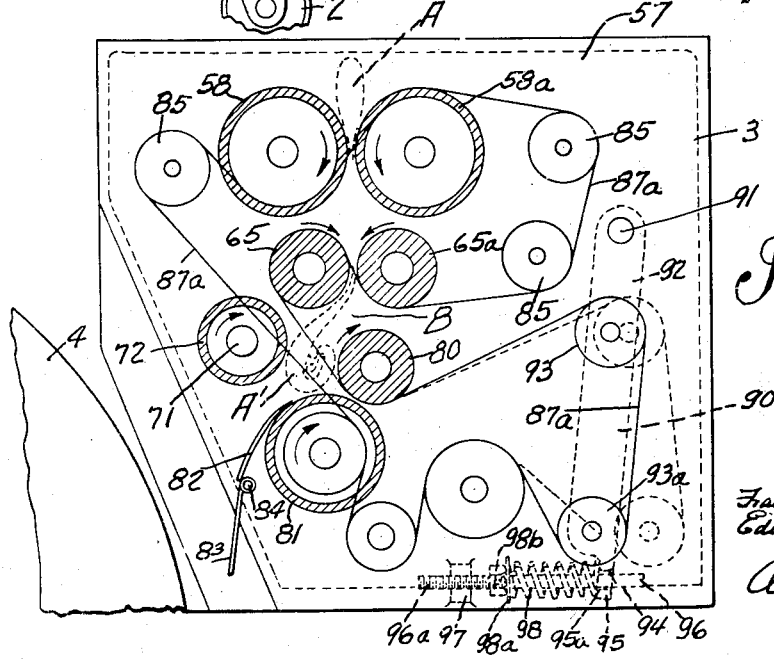
Figure 4 is a diagrammatic representation of the arrangement of the rolls in the dough loaf forming mechanism, together with the driving mechanism for the rolls.
Figure 5:
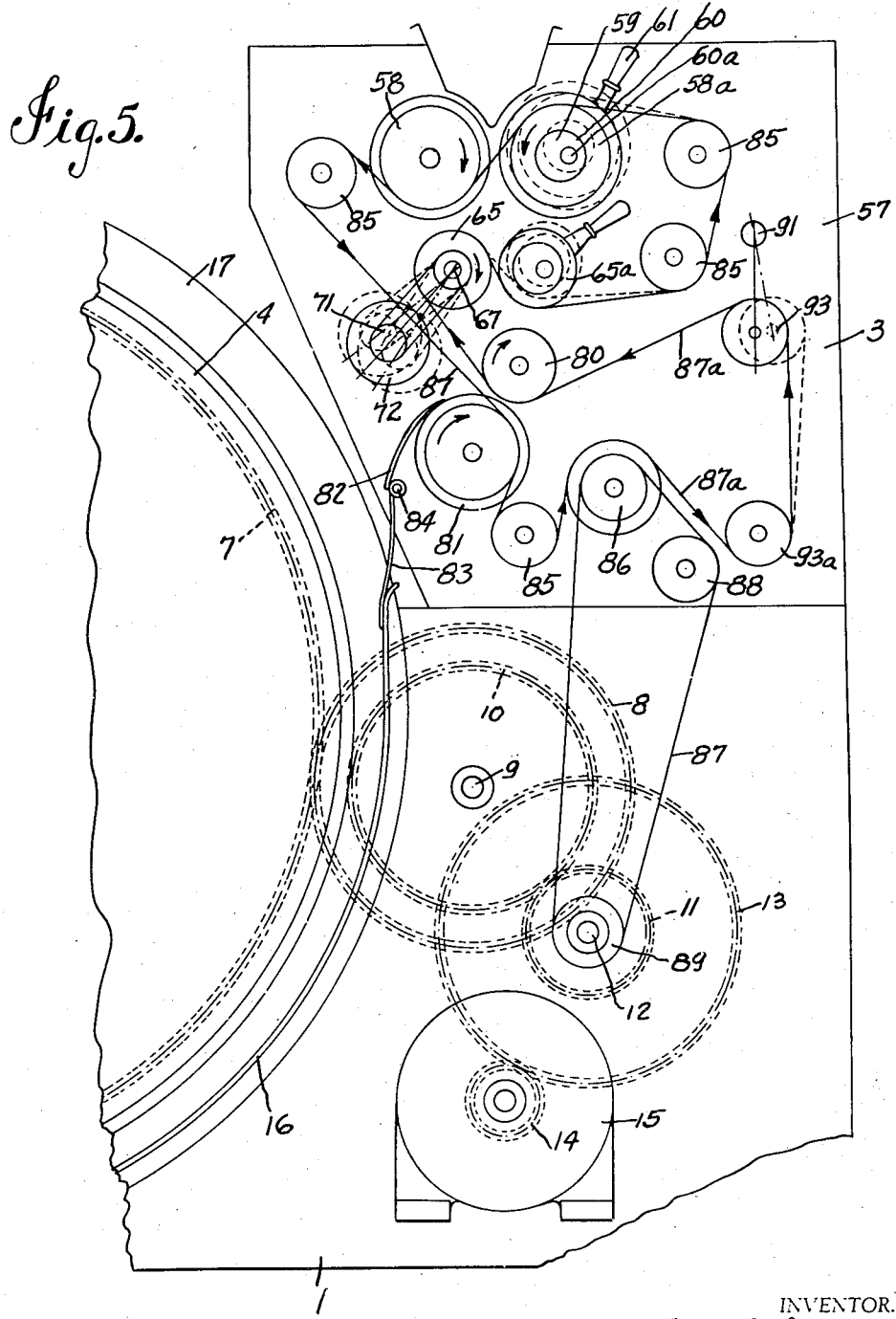
Figure 5 is an elevation diagrammatically illustrating the drum and head drive.
Figure 6:
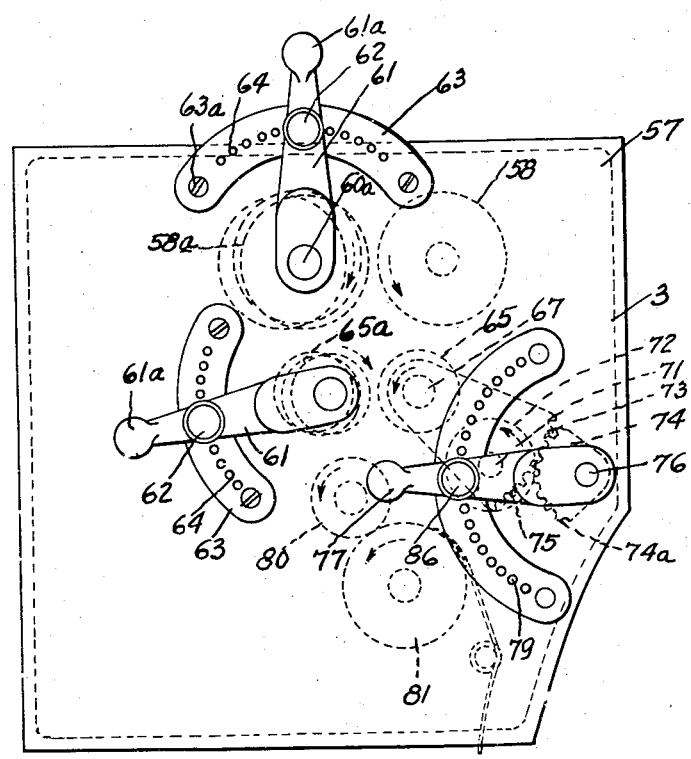
Figure 6 is an elevation showing the levers for adjusting the batch coiling rolls.

The dough molding machine is mounted within a cabinet 1 supported on casters 2 for portability. The section of the cabinet in which the batch coiling mechanism is located is indicated at 3. A molding drum 4 is supported on a shaft 5 which is rotatably mounted in journals 6 fixed to the cabinet of the machine. A gear 7 is fixed to the shaft 5 which supports the drum, and this gear is driven by another gear 8 which is fixed on a shaft 9. Another gear 10 is fixed on the shaft 9, and this gear meshes with and is driven by another gear 11. The gear 11 is fixed on another shaft 12 which has another gear 13 also fixed thereon. This last mentioned gear meshes with and is driven by another gear 14 fixed to a shaft of a motor 15 which drives all of the rotating parts on the machine.

In Figures 1 and 3 a pressure plate 16 and side guides 17, curved concentric with the surface of the drum, are spaced a definite distance from the surface and side edges of the drum. The pressure plate and the side guide members are supported on rods 18, one on each side, which are detachably pivotally connected in lugs 19 at the base of the side guides. The rod has enlarged head 20 with a hole 21 embracing the end of the shaft 5. This method of support permits the pressure plate and the side guides to swing free during adjustment, and also to swing the pressure plate in position beneath the drum. A strap 22 with slots 23 is fixed to the edges 24 of the side guides. At the discharge end 25 ears 26 with slots 27 are provided. Fixed to the cabinet side are lugs 28 and 29 in which are adjustably mounted clamp screws 30 and 31, which hold the pressure plate and side guides in a set position after adjustment.

At the end 25 of the pressure plate a hinge 33 with its pin 34 for a swinging end plate 35 is provided. The end 36 of this swinging plate is bent over and is permitted to contact with a conveyor, and is provided to compensate for the change of position of the pressure plate with relation to a conveyor due to adjustments of the pressure plate.

For varying the space between the surface of the drum and the pressure plate, we have provided a series of pull rods 37. The ends 38 of the pull rods have holes 39 for rotatably mounting them on pins or studs 40 that are fixed in a disc 41 supported on and rotatable relatively to an extension of the shaft 5. The other ends 42 have holes 43 for detachable connection to studs 44 that are fixed in arms 45 which are fixedly mounted on and cause the shafts 46 to rotate in the side guides 17 by the action of the pull rods. Also mounted and fixed on the shafts 46 are the cam shaped fingers 47 which, when rotated by the shaft, push against the pressure plate and thereby vary the distance between the surface of the drum and the inner surface of the pressure plate.

A hand wheel 49 is rotatably mounted on a stud that is fixed on the casing of the machine. Fixed to the hand wheel and rotatable with it is a bevel gear 50 which is in engagement with another bevel gear 51. The gear 51 is fixed on a shaft 52 which is rotatably mounted in bearings 53 of a bracket 54 which is fixed to the casing of the machine. On the other end of the shaft 52a is fixed a worm 55 which engages with a sector 56 of a worm gear. This sector of worm gear is fixed on and rotates the rotatable disc 41, so that as the hand wheel 49 is rotated counterclockwise, the disc is also rotated counterclockwise. The rotation of this disc pulls on the rods, and they in turn pull on the levers, which cause the shafts and the cam fingers to rock and apply pressure against the pressure plate and force it towards and hold it at a determined distance from the surface of the drum.

Figures 2, 4, 5 and 6 show the position of the rolls which are used in the batch coiling end of the machine. Within the casing 57 there are adjustably mounted a series of rolls which are so spaced as to permit the dough batches to pass between them. Thus, in Figure 4 we have illustrated the upper rollers 58 and 58a so as to permit a batch of dough A to pass between the rollers. The roller 58 is supported on a shaft which is rotatably mounted in bearings provided and fixed on the casing. The position of this roller is never changed, but it, too, can be made adjustable with relation to its companion roller, if desired. The companion roller 58a is adjustably mounted in this case.

Centrally within the roller 58a is mounted an eccentric 59 upon which the roller is rotatably mounted. The eccentric has a hole 60 for a shaft 60a which supports the eccentric and the roller. The eccentric extends through to the outside of the casing where a lever 61 is fixed to it. Whenever the lever is rotated the eccentric will rotate with it and, depending upon which direction the lever is rotated, the roller 58a will move closer or away from the fixed roller 58. Several positions of the roller 58a are shown in dotted lines in Figure 6. The lever 61 has a ball 61a at its end, and a spring actuated locating pin 62 is slidably mounted in a hole in the shank of the handle. A curved sector 63 is secured to the casing by screws 63a. Over the length of the sector are spaced holes 64 which may be graduated to show the various positions of the roller 58a. These holes are for the locating pin and hold the lever in a set position.

After passing between the spaced rollers 58 and 58a, the dough next passes between the rollers 65 and 65a. The roller 65a in this case is adjustable in the same manner as the roller 58a with an eccentric and lever to move it. From between these rollers the dough batch falls into a forming pocket B in which it is coiled in the manner indicated at A in Figure 4. The roller 65 is supported on a shaft 67 rotatably mounted in bearings on the side of the cabinet.

On the outside end of the shaft 67 there is a sprocket 68 which is connected to another sprocket 69 and drives it by a chain 70. The sprocket 69 is fixed on a shaft 71 upon which is fixed a roller 72. The shaft 71 is rotatably supported in gear sectors 73 and 73a which are pivotally supported on the shaft 67. The roller 72 is adjustable so as to increase or decrease the size of the pocket B.

Other gear segments 74, whose gear teeth 74a are in mesh with the gear teeth 75 on the gear segments 73, are fixed on a shaft 76. The shaft 76 is rotatably mounted in bearings on the casing. On the end of the shaft is a lever 77 in which is slidably mounted a spring actuated locating pin 78. The pin engages in spaced holes 79 provided in a curved bracket secured to the outside of the casing of the machine. The holes may be located by graduations in order to adjust the roller to any desired position. When the pin is in a particular hole the lever will be held in a set position.

A roller 80, fixed with relation to the adjustable rollers, is rotatably mounted in bearings fixed to the side of the machine. This roller rotates in a clockwise direction and causes the dough to roll in the manner shown. Another roller 81 fixed with relation to the adjustable rollers, is also rotatably mounted in bearings on the side of the casing. The coiled dough passes between this last mentioned roll and the roller 72 before discharging to the space between the pressure plate and the drum.

A discharge apron 82 is tangent to the roller 81 and assists in the separation of the coiled dough from the roller 81. Directly beneath the discharge apron is another baffle 83 which is an extension of the discharge apron 82. This baffle is pivotally mounted on studs 84 which are fixed in the sides of the cabinet of the machine. It extends from beneath the discharge apron down into the space between the pressure plate and the drum, where it lies against the inner surface of the pressure plate. This baffle compensates for the variation of the distance between the top edge of the pressure plate and the roller 81, due to adjustments, and insures that the dough will pass into the space between the drum and the pressure plate.

All of the rollers are driven by one endless roller chain which weaves in and around the various sprockets attached to the shafts of the rollers so as to drive them in the direction as indicated by the arrows. In addition to the sprockets on the roller shafts, there are other idler sprockets 85. There is a main drive sprocket 86 driven by a chain 87 which passes around an idler 88, and another drive sprocket 89 fixed on and driven by the shaft 12.

In order to keep the chain 87 taut and in contact with all of the sprockets driven by it, we have provided a novel self-adjusting chain tightener 90. A stud 91, fixed in the casing of the machine, rotatably supports an arm 92. On the arm 92 there are two rotatably supported sprockets 93 and 93a, over which the chain 87 passes. At the end 94 of the arm a boss 95, with a hole 95a, slidably engages a rod 96. The rod has a threaded end 96a which screws into a threaded fixed boss 97 on the casing of the machine. Surrounding the rod is a compression spring 98 which bears against the face of the boss on the arm, and a washer 98a, which is held against the spring by an adjusting nut 98b. This nut adjusts the tension of the spring, so that it will always push the arm towards the right in Figure 4, and when any of the rollers are adjusted, take up any slack in the chain that would occur because of this adjusting.

When a load of dough comes on top of the rollers 58 and 58a, it will pass between them and be rolled into a sheet. This sheet will then pass between the lower rollers 65 and 65a, where it will receive further rolling. The leading end of the sheet of dough then enters the pocket B, where it comes into contact with the rollers 80, 81 and 72, which form it into a coil as shown at A'. When the entire load has been coiled, the coiled dough will pass between the rollers 72 and 81, and the roller 72 will eject the coiled dough which will pass along the apron down into the space between the pressure plate and the rotating drum. As soon as the coil comes into contact with the drum, it will be rolled along the inner surface of the pressure plate and carried around to the discharge end of the machine, where it will pass on to a conveyor to a desired operation in line with the completion of the baking.

Having thus described our invention, what we claim as new and desire to secure by Letters Patent, is:—

1. A dough loaf molding machine comprising a drum and having a flexible arcuate pressure board with side retaining members upon which said pressure board is adjustably supported, mounted as a demountable unit in said machine, and means for adjusting the position of said pressure board relative to said drum, said means comprising pull bars and cam mechanism which said pull bars engage, said cam mechanism mounted in such position on said side members as to bear against said pressure board.

2. A dough loaf molding machine comprising a drum and having a flexible arcuate pressure board with side retaining members upon which said pressure board is adjustably supported, mounted as a demountable unit in said machine, and means for adjusting the position of said pressure board relative to said drum, said means comprising pull bars and cam mechanism which said pull bars engage, said cam mechanism mounted in such position on said side members as to bear against said pressure board, and a rotary disc eccentrically mounting said pull bars.

3. In a dough molding machine, a drum, an arcuate pressure plate coacting with said drum and made up of sections, one of which is adjustable to and from the drum, means for entering dough between the plate and the drum at one end of the plate, means for receiving dough from between said plate and drum at the other end of said plate, another section of said plate, adjacent to this other end, being pivoted on said one section to swing toward and from the drum and having an extension which it maintains over said receiving means during its swinging.

4. In a dough molding machine, a drum, an arcuate pressure plate coacting with said drum, side members, means supporting said plate on said side members for adjustment to and from the drum, actuating means at the axis of the drum, detachably connected to the adjustment means, and means detachably connecting said side members to the drum for swinging said plate and side members coaxially with the drum, whereby said plate and side members may be swung to operative position under the drum or to a position over the drum for detachment and removal therefrom.

5. In a dough molding machine, a drum, an arcuate pressure plate coacting with said drum, side members, means supporting said plate on said side members for adjustment to and from the drum, a casing, means connecting said side members together and detachably connected to said casing, actuating means mounted on the casing, detachably connected to the adjustment means, and means detachably connecting said side members to the casing for swinging said side members and the plate coaxially with the drum, whereby, when the means that connects the side members together is detached from the casing, said plate and said side members may be swung around the drum for detachment and removal from the casing.

6. A dough loaf molding machine comprising a drum, mechanism at one portion of the periphery of said drum for feeding dough to said periphery, mechanism at a substantially opposite portion of said periphery for receiving dough from said periphery, an arcuate pressure board extending around said periphery from one end of said mechanisms to the other, side retaining members extending along opposite lateral edges of said pressure board and adjustably supporting said pressure board, said pressure board and said side retaining members being mounted as a demountable unit in said machine, with said side retaining members lapping across the respective sides of the drum adjacent to the drum periphery so as to prevent removal of the unit in direction along the axis of the drum, and said mechanism at both portions of the drum periphery being spaced from said periphery sufficiently to permit said unit to be moved arcuately into or out of its operative position between the two mechanisms, through the space between said one mechanism and the drum periphery, and said unit being so mounted in the machine as to permit said arcuate movement, and the unit, when in its initial position for insertion into the machine, and, when in its final position for removal from the machine, being substantially inverted from its operative position between the two mechanisms.

FRANK X. LAUTERBUR.
EDWARD J. LAUTERBUR.